US008432781B2

(12) United States Patent
Knappmann et al.

(10) Patent No.: US 8,432,781 B2
(45) Date of Patent: Apr. 30, 2013

(54) METHOD AND APPARATUS FOR READING FROM A NEAR-FIELD OPTICAL RECORDING MEDIUM, AND NEAR-FIELD LENS FOR THE APPARATUS

(75) Inventors: Stephan Knappmann, Rottweil (DE); Frank Przygodda, Friedrichshafen (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/517,469

(22) PCT Filed: Dec. 7, 2010

(86) PCT No.: PCT/EP2010/069092
§ 371 (c)(1),
(2), (4) Date: Jun. 20, 2012

(87) PCT Pub. No.: WO2011/076561
PCT Pub. Date: Jun. 30, 2011

(65) Prior Publication Data
US 2012/0257488 A1 Oct. 11, 2012

(30) Foreign Application Priority Data
Dec. 21, 2009 (EP) .................................... 09306296

(51) Int. Cl.
*G11B 7/00* (2006.01)
(52) U.S. Cl.
USPC ................................. 369/112.03; 369/112.23
(58) Field of Classification Search ............... 369/112.03
See application file for complete search history.

(56) References Cited

U.S. PATENT DOCUMENTS

| 5,917,788 A * | 6/1999 | Mowry ....................... 369/44.23 |
| 6,445,453 B1 * | 9/2002 | Hill .............................. 356/450 |
| 2003/0147083 A1 * | 8/2003 | Hill .............................. 356/491 |
| 2007/0013999 A1 * | 1/2007 | Marks et al. .................. 359/368 |

FOREIGN PATENT DOCUMENTS

| JP | 2001-201687 | 7/2001 |
| JP | 2002-358687 | 12/2002 |
| JP | 2009-015944 | 1/2009 |

OTHER PUBLICATIONS

JP2009-015944—Abstract.
JP2002-358687—Abstract.
JP2001-201687—Abstract.
Mikami etal: "Amplification of Optical Disk Readout Signals by Homodyne Detection", Japanese Journal of Applied Physics, vol. 48, Mar. 23, 2009, pp. 03A014-1-03A014-2.
Search Report Dated Feb. 11, 2011.

* cited by examiner

*Primary Examiner* — Van Chow
(74) *Attorney, Agent, or Firm* — Robert D. Shedd; Richard LaPeruta

(57) ABSTRACT

A method and an apparatus for reading from a near-field optical recording medium are described. The apparatus includes:
  an optical system for generating a signal beam and a reference beam;
  a near-field lens for illuminating the signal beam onto the near-field optical recording medium, for collimating a reflected signal beam, and for reflecting the reference beam; and
  at least a first detector and a second detector for obtaining a homodyne detection signal from the reflected signal beam and the reflected reference beam.

11 Claims, 10 Drawing Sheets

Figure 1:
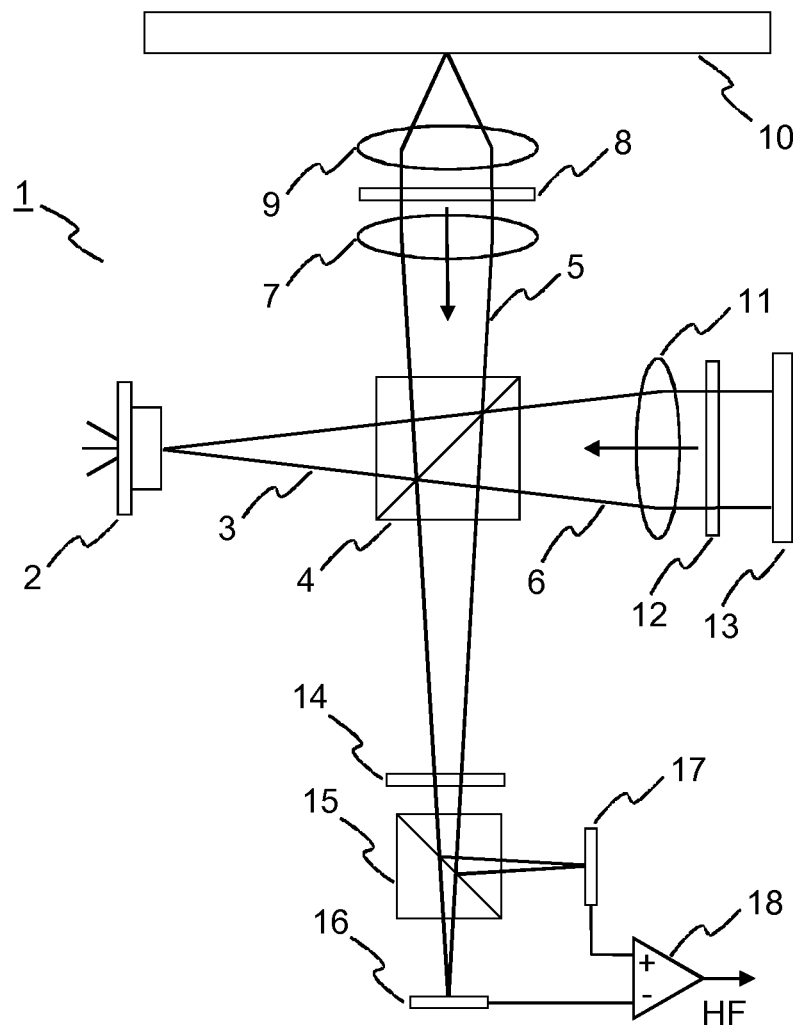

METHOD AND APPARATUS FOR READING FROM A NEAR-FIELD OPTICAL RECORDING MEDIUM, AND NEAR-FIELD LENS FOR THE APPARATUS

This application claims the benefit, under 35 U.S.C. §365 of International Application PCT/EP2010/069092, filed Dec. 7, 2010, which was published in accordance with PCT Article 21(2) on Jun. 30, 2011 in English and which claims the benefit of European patent application No. 09306296.6, filed Dec. 21, 2009.

The present invention relates to a method and an apparatus for reading from a near-field optical recording medium, and to a near-field lens for use in such an apparatus. More specifically, the invention relates to a method and an apparatus for reading from a near-field optical recording medium using a homodyne detection scheme.

Optical data storage is generally limited by the optical resolution of the read/write-system. Straightforward methods of increasing the optical resolution include using a shorter wavelength and a larger numerical aperture NA, at the costs of lens complexity. Further approaches are narrowing the allowable tilt margins for the optical storage media or reducing the wavelength of the scanning laser into the blue or near-UV range. A different approach for reducing the focus spot size in an optical data storage system is using near-field optics with a high numerical aperture (NA>1). This high numerical aperture is generally achieved by help of a solid immersion lens (SIL). While conventional systems like CD, DVD or BD operate in the optical far-field regime, which is described by classical optics, the aforementioned new systems work in the optical near-field regime, which is described by near-field optics. For conventional systems the working distance, i.e. the air gap between the surface of the optical storage medium and the first optical surface of the read/write-head, usually the objective lens, is in the scale of 100 µm up to several 100 µm. In contrast, systems making use of near-field optics need a very small working distance or air gap, which is in the scale of 50 nm or less. The small air gap is necessary to ensure that evanescent waves may couple into optical storage medium.

Homodyne detection denotes a detection technique, where a signal carrier (signal beam) is superimposed coherently with the signal of a local oscillator (local oscillator beam). In an optical pickup, the signal beam is the laser light reflected from the optical recording medium. The local oscillator beam, which is also denoted reference beam, is a light beam extracted directly from the light source, e.g. with a beam splitter. Both light beams are superimposed coherently on a detector, where constructive and destructive interference occurs. An important advantage of homodyne detection is the amplification of the signal. Since the contrast of the resulting signal occurs from constructive and destructive interference between the signal beam and the local oscillator beam, it is larger than the intensity of the signal beam itself. The amplification can be further increased when the local oscillator beam is stronger than the signal beam. As homodyne detection improves the signal to noise ratio, it is advantageously used in storage systems, which have to deal with weak signals. A near-field storage system is an example of such a storage system, especially in combination with multi-layer optical recording media.

As stated above, homodyne detection in an optical storage system is based on the coherent superposition of a signal beam and a reference beam. This means that the superposition has to be done within the coherence length of the light source. If the optical path lengths of the two light beams differ, a source with a large coherence length needs to be used. Such laser sources are generally rather large and expensive. The laser diodes that are typically used in optical pickups have a relatively short coherence length of a few hundred micrometers. Therefore, the optical path lengths of the two light beams have to be equal within the coherence length. Since the signal beam is reflected from the optical recording medium, its path length may vary due to variations of the actual distance of the optical recording medium with respect to the pickup, e.g. due to axial run-out. Hence the path length of the reference beam needs to be adjusted in real time to ensure a coherent superposition of both light beams.

In this regard the article H. Mikami et al.: "Amplification of Optical Disk Readout Signals by Homodyne Detection", Jap. J. Appl. Phys., Vol. 48 (2009), pp. 03A0147-1-03A0147-4, discloses an apparatus for reading from an optical recording medium using a homodyne detection scheme. In order to compensate for path length variations due to movements of the surface of the optical recording medium a corner-cube prism for the reference beam is mounted on the lens actuator for the reproducing beam.

It is an object of the invention to propose an improved solution for an apparatus for reading from a near-field optical recording medium using homodyne detection.

According to a first aspect of the invention, an apparatus for reading from a near-field optical recording medium includes:
  an optical system for generating a signal beam and a reference beam;
  a near-field lens for illuminating the signal beam onto the near-field optical recording medium, for collimating a reflected signal beam, and for reflecting the reference beam; and
  at least a first detector and a second detector for obtaining a homodyne detection signal from the reflected signal beam and the reflected reference beam.

Similarly, according to a further aspect of the invention, a method for reading from a near-field optical recording medium has the steps of:
  generating a signal beam and a reference beam;
  illuminating the signal beam onto the near-field optical recording medium with a near-field lens;
  collimating a reflected signal beam with the near-field lens;
  reflecting the reference beam with the near-field lens; and
  obtaining a homodyne detection signal from the reflected signal beam and the reflected reference beam with at least a first detector and a second detector.

According to still a further aspect of the invention, a near-field lens for an apparatus for reading from a near-field optical recording medium has a front surface that has an essentially flat reflecting surface located at a distance from an optical axis of the near-field lens.

A basic idea of the present invention is to send the reference beam together with the signal beam to a special near-field lens. This near-field lens is adapted to reflect the reference beam back towards the detectors, whereas the signal beam is illuminated onto the data layer of the near-field optical recording medium. This has the advantage that the path lengths of both light beams varies in the same way if the distance between the detectors and the near-field optical recording medium changes. This is due to the fact that the near-field lens has a fixed distance with respect to the surface of the near-field optical recording medium, which is ensured by an actuator. In particular the tolerances for variations of the working distance are restricted to about ±2 nm which is not critical for the homodyne detection method. To allow for the reflection of the reference beam at the near-field lens the near-field lens is provided an essentially flat reflecting surface. Preferably, the reflecting surface is provided with a reflective coating. This allows to increase the amplitude of the reflected reference beam. In addition, the reflecting surface is advantageously inclined with respect to a plane perpendicular to the optical axis of the near-field lens. In this way the direction of the reflected reference beam is optimized.

Advantageously, the optical system includes a light source for generating a reading light beam from which the signal beam and the reference beam are generated by an optical element. By generating both the signal beam and the reference beam with the same light source no special provisions are needed for ensuring the coherence of both light beams. It is sufficient to maintain the difference between the optical path lengths of the two light beams within the limits of the coherence length.

Preferably, the reference beam is inclined with respect to the signal beam. In this way the signal beam and the reference beam are spatially separate at the front surface of the near-field lens, which allows to reflect the reference beam without reflecting the signal beam.

Favorably, the optical element is a polarizing grating including at least a grating structure and a liquid crystal layer. The liquid crystal is chosen such that the grating is not visible for one polarization direction, whereas it acts as a diffractive element for a perpendicular polarization. In this way one polarization component is kept unchanged and is used as the signal beam. The beam component with perpendicular polarization is diffracted at a small angle and is used as the reference beam.

Advantageously, the reflected signal beam is split into at least two partial signal beams, e.g. by the optical element. While one of the partial beams is used for obtaining the homodyne detection signal, the other partial beam is used for obtaining a track error signal or a further homodyne detections signal. In the latter case the signal to noise ratio is increased by evaluating more than one homodyne detection signal.

Favorably, the reflected reference beam is split into at least two partial reference beams, e.g. by a beam splitter. This is useful when more than one homodyne detection signal shall be generated and evaluated.

Figure 2:
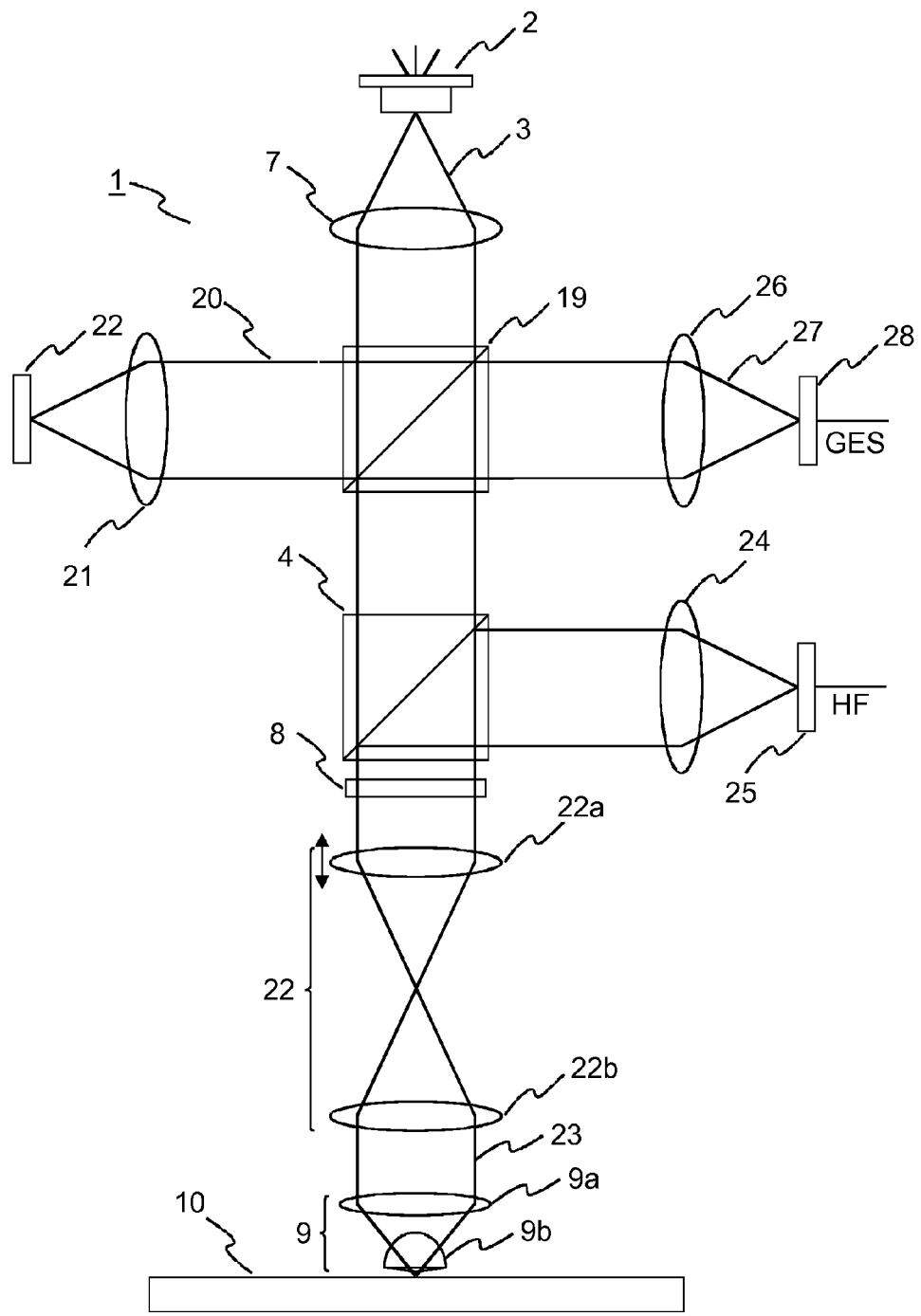
Figure 3:
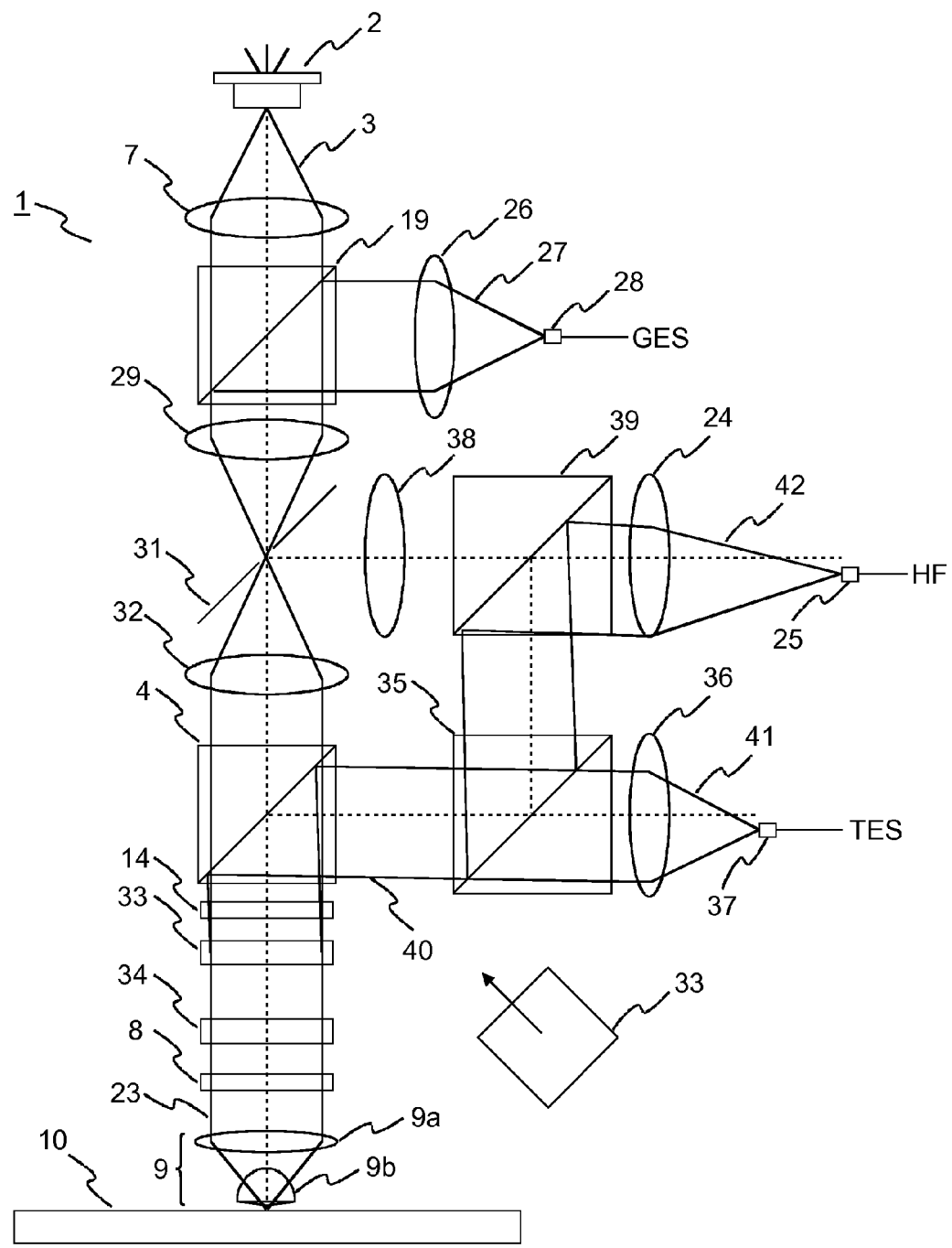
Figure 4:
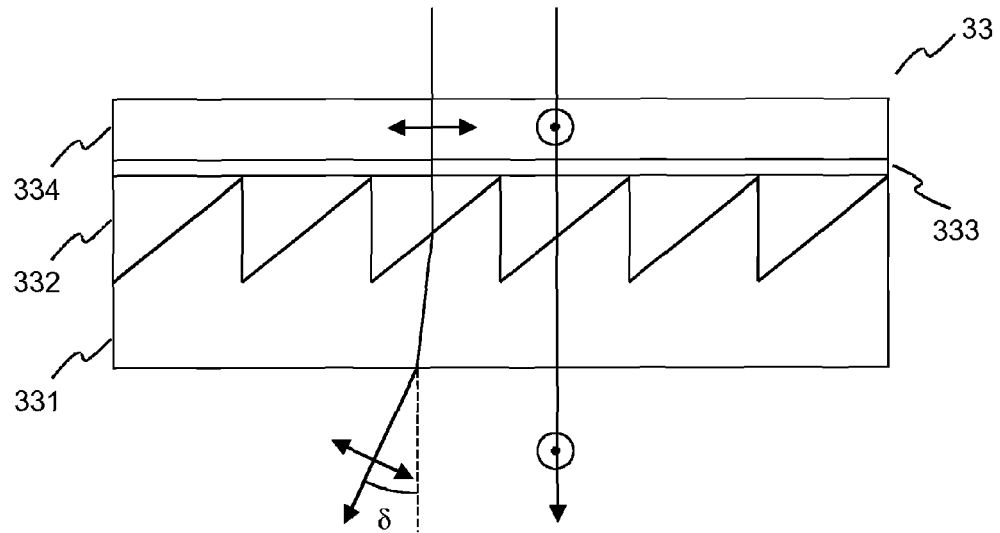
Figure 5:
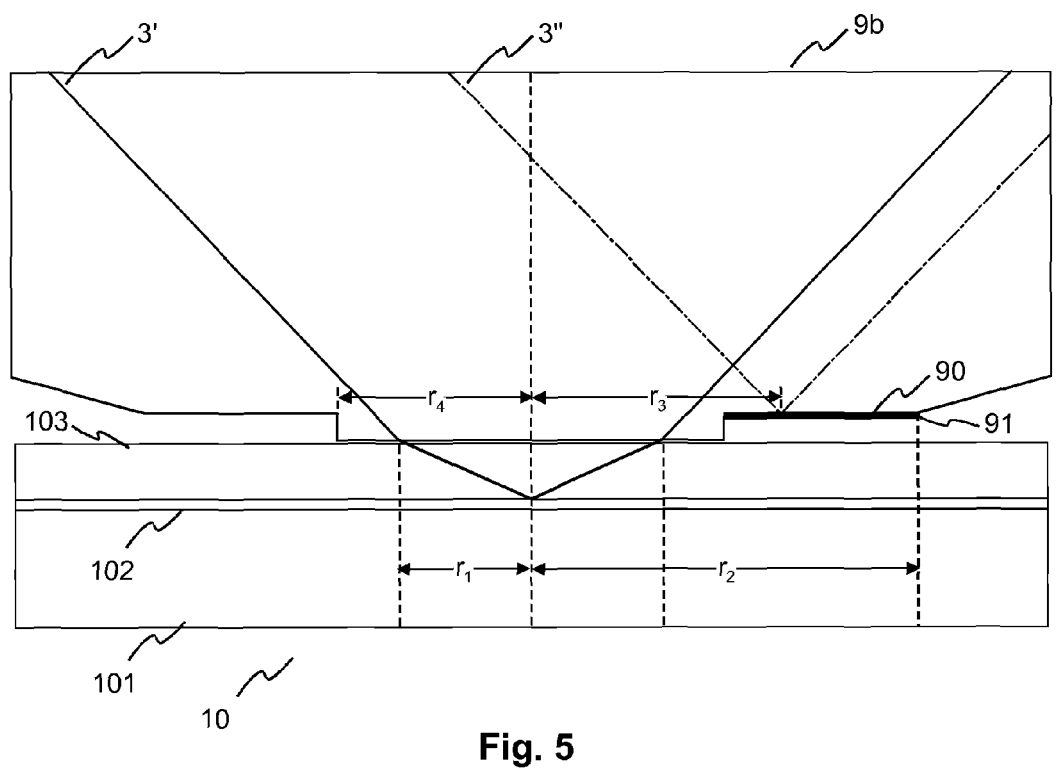
Figure 6:
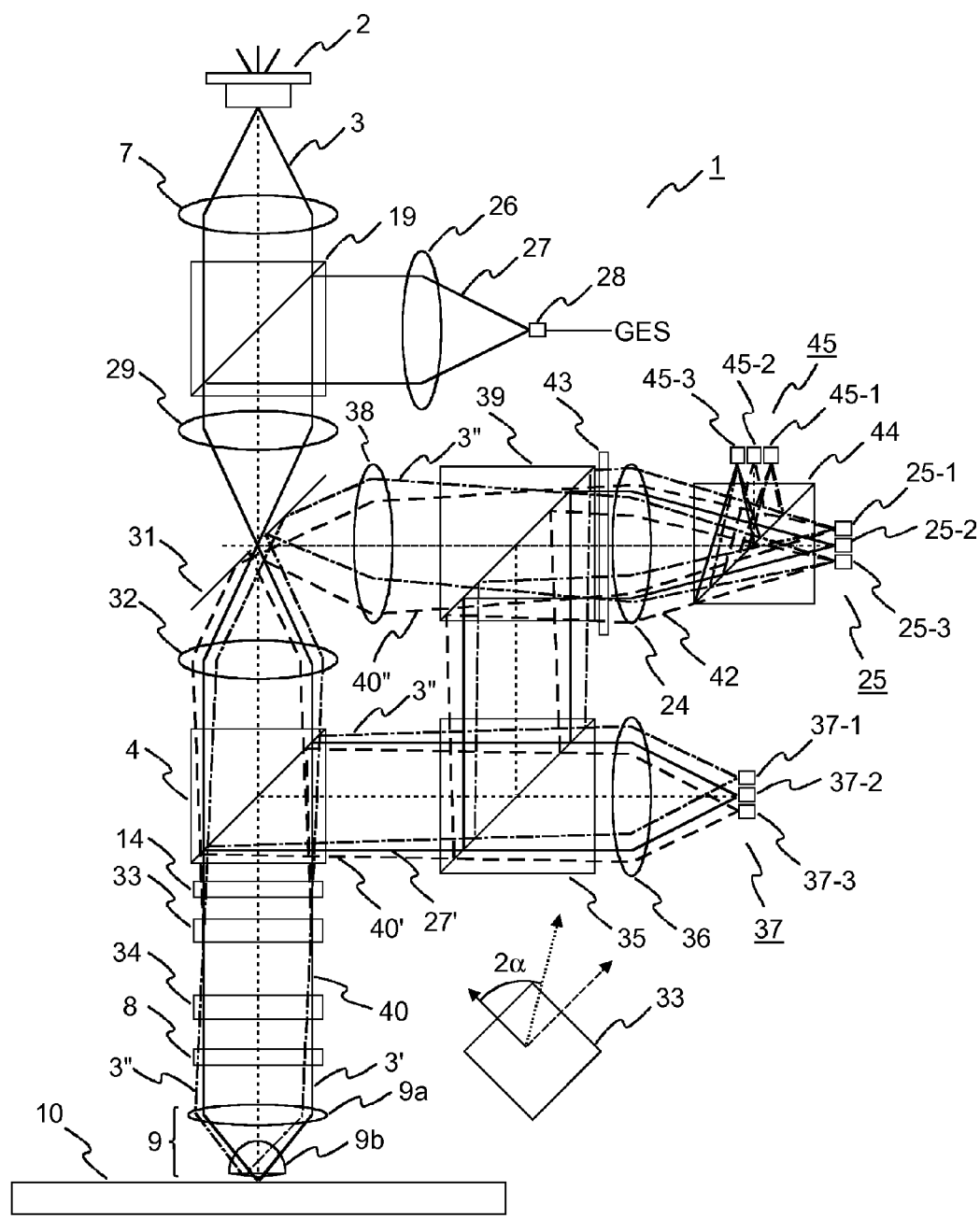
Figure 7:
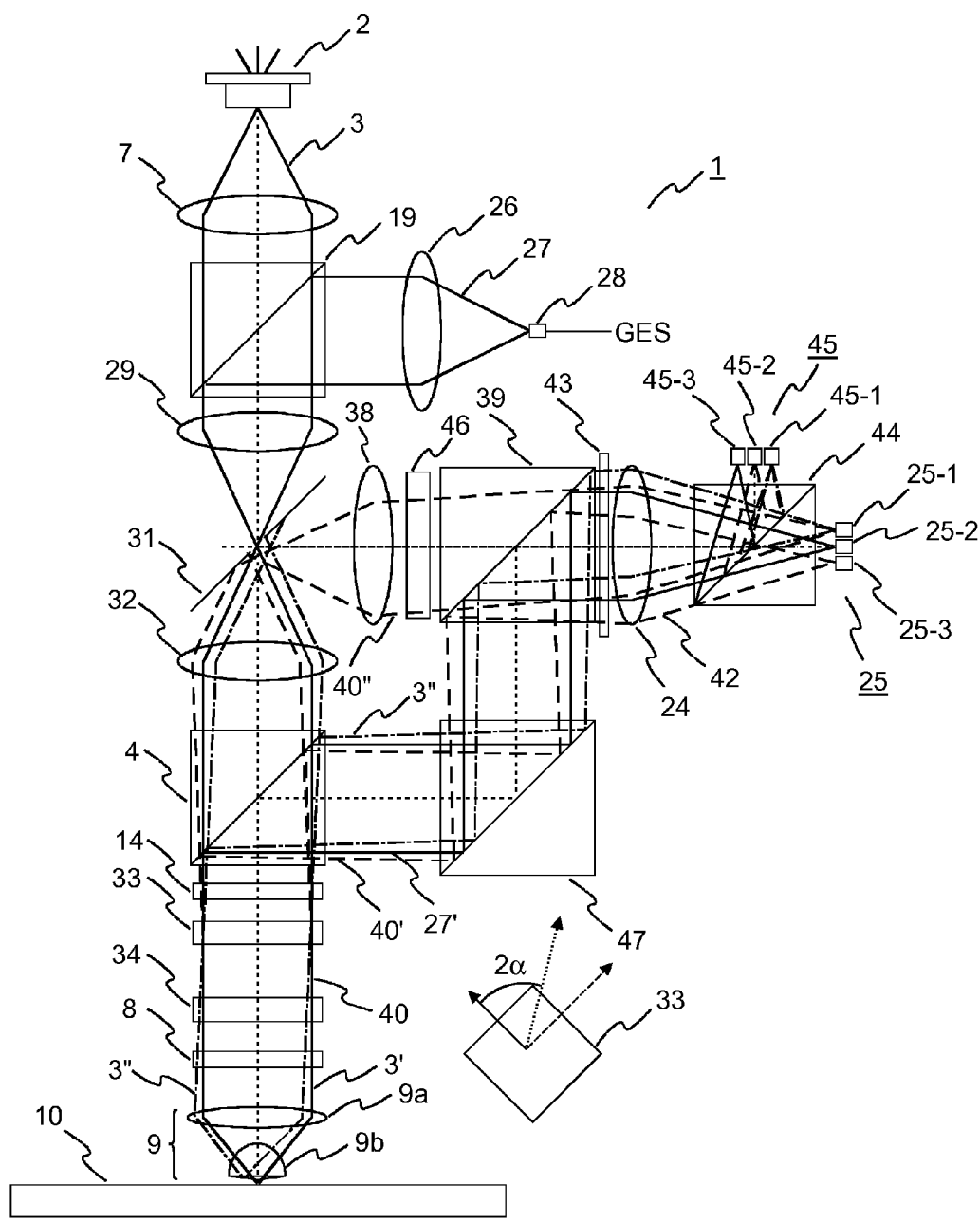
Figure 8:
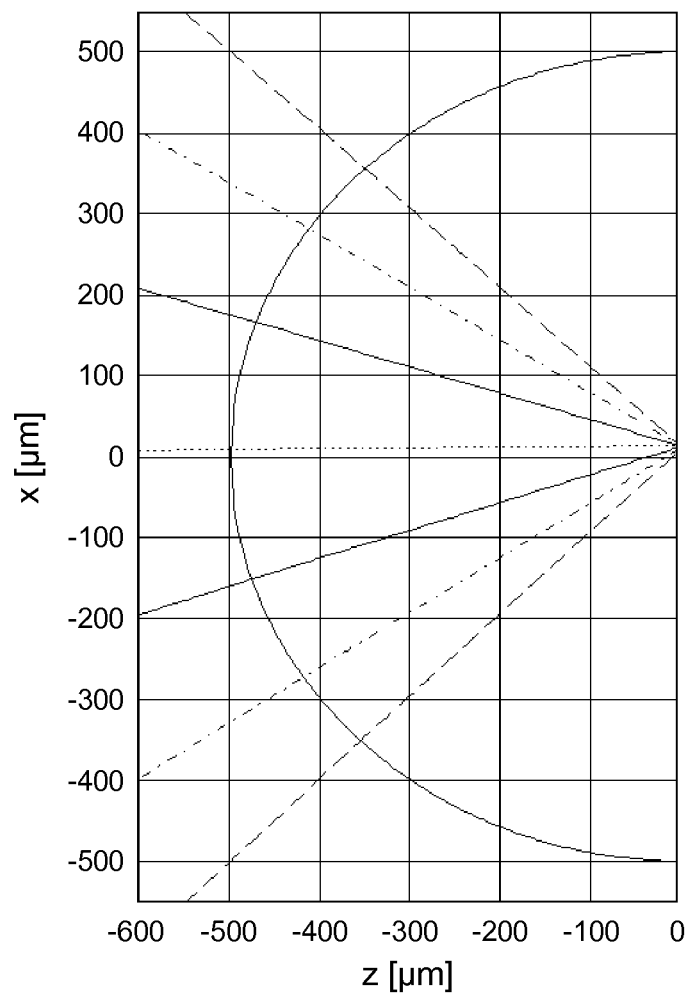
Figure 9:
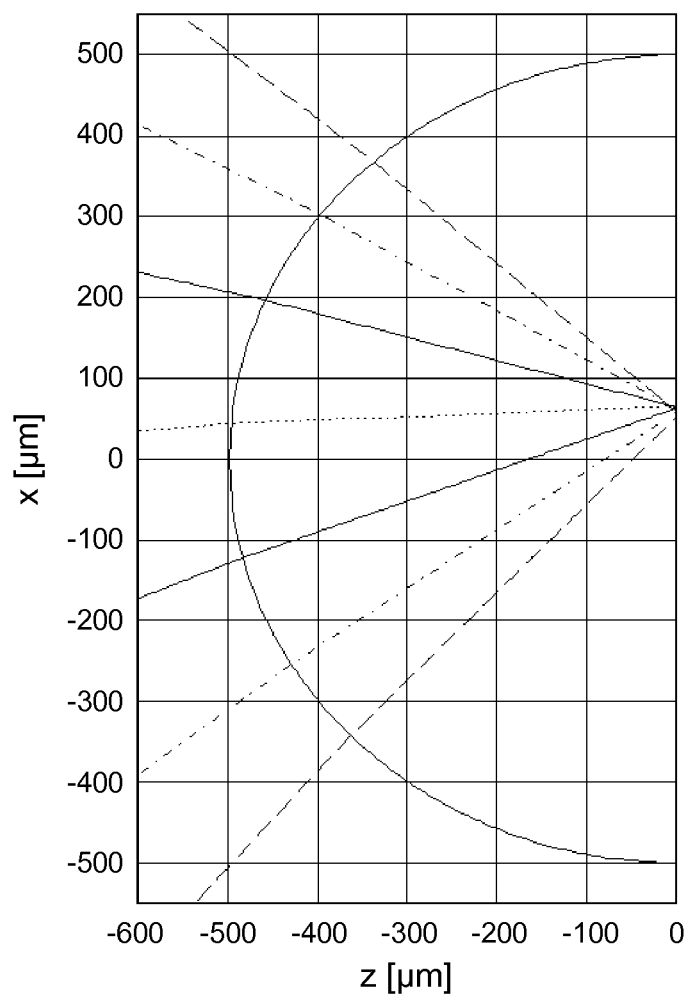
Figure 10:
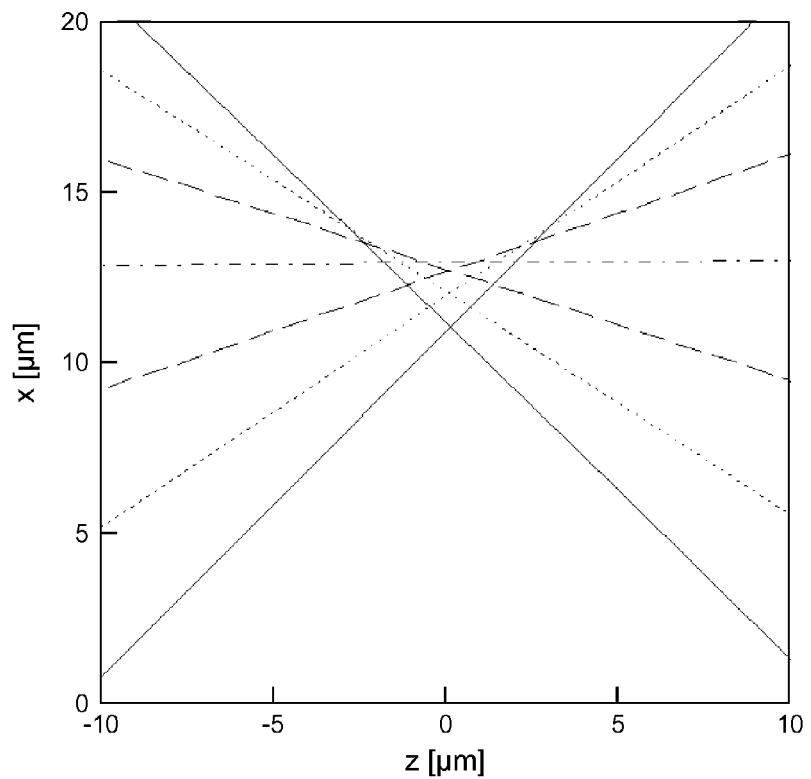
Figure 11:
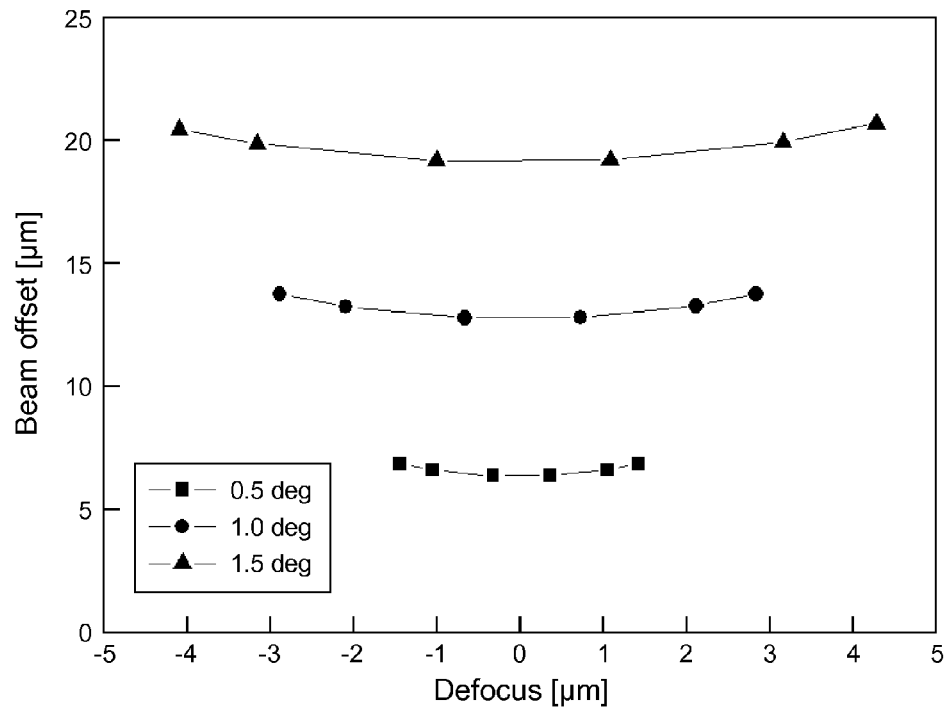
Figure 12:
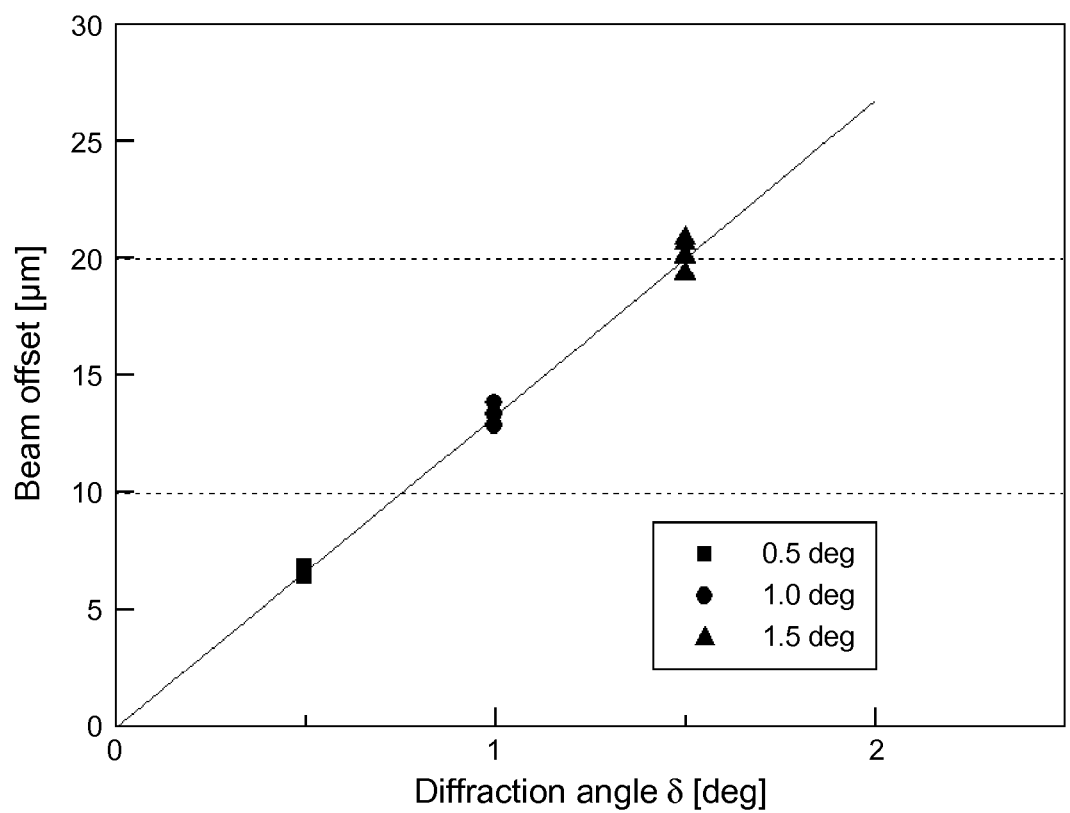

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 1 illustrates a known apparatus for reading from a optical recording medium using homodyne detection, FIG. 2 depicts a known apparatus for reading from a near-field optical recording medium, FIG. 3 shows the basic concept of an apparatus according to the invention for reading from a near-field optical recording medium, FIG. 4 depicts a polarizing grating used in the apparatus of FIGS. 3 and 6, FIG. 5 illustrates a solid immersion lens used in the apparatus of FIGS. 3 and 6, FIG. 6 depicts the apparatus of FIG. 3 in a homodyne detection mode, FIG. 7 depicts a second embodiment of an apparatus according to the invention, FIG. 8 shows a simulation of an inclined illumination of the solid immersion lens resulting from a diffraction angle $\delta$ of $1°$, FIG. 9 depicts a simulation of an inclined illumination of the solid immersion lens resulting from a diffraction angle $\delta$ of $5°$, FIG. 10 shows an enlarged view of the blurred focus for the diffraction angle $\delta$ of $1°$, FIG. 11 illustrates the increasing defocus and beam offset with increasing inclination angle $\delta$, and FIG. 12 depicts the increase of the beam offset with the inclination angle $\delta$.

Homodyne detection denotes a detection technique, where a signal carrier is superimposed coherently with the signal of a local oscillator. In an optical pickup, the signal beam is the laser light reflected from the optical recording medium. The local oscillator is a beam extracted directly from the laser source, e.g. with a beam splitter. Both light beams are superimposed coherently on a detector, where constructive and destructive interference occurs. An exemplary apparatus 1 for reading from an optical recording medium 10 using homodyne detection is schematically depicted in FIG. 1. The figure is based on a homodyne detection system described in H. Mikami et al.: *"Amplification of Optical Disk Readout Signals by Homodyne Detection"*, Jap. J. Appl. Phys., Vol. 48 (2009), pp. 03A014. A light source 2 emits a light beam 3, which is split by a first polarization beam splitter 4 into a signal beam 5 and a local oscillator beam 6. The signal beam 5 is collimated by a first collimating lens 7, passes through a first quarter wave plate 8, and is focused onto the optical recording medium 10 by an objective lens 9. The local oscillator beam 6 is collimated by a second collimating lens 11, passes through a second quarter wave plate 12, and is reflected by a mirror 13. Due to the quarter wave plates 8, 12 the directions of polarization of the reflected signal beam 5 and the reflected local oscillator beam 6 are rotated by 90°, so that the two light beams 5, 6 are combined by the first polarization beam splitter 4 and directed towards a half wave plate 14. The half wave plate 14 adjusts the polarization states of the two light beams 5, 6. A second polarization beam splitter 15 splits the two light beams 5, 6 in order to enable destructive and constructive interference of the two light beams 5, 6 on a first detector 16 and a second detector 17, respectively. The difference between both signals is generated by a differential amplifier 18 and output as a homodyne detection signal HF.

An exemplary apparatus 1 for reading from a near-field optical recording medium is illustrated in FIG. 2. This apparatus is known from C. A. Verschuren et al.: *"Near-Field Recording with a Solid Immersion Lens on Polymer Coverlayer Protected Discs"*, Jap. J. Appl. Phys., Vol. 45 (2006), pp. 1325-1331. A reading light beam 3 emitted by a laser diode 2 is collimated by a collimating lens 7. A non-polarizing beam splitter 19 directs a small fraction 20 of the reading light beam 3 via a first focusing lens 21 onto a forward detector 22 for measuring the output power of the laser diode 2. The main part of the reading light beam 3 passes a polarizing beam splitter 4 and a quarter wave plate 8, which converts the polarization of the reading light beam 3 into a circular polarization. The reading light beam 3 then passes through a telescope 22 for focus adjustment, which consists of two lenses 22a, 22b. A near-field lens 9 consisting of a second objective lens 9a and a solid immersion lens 9b finally directs the reading light beam 3 onto the surface of an optical recording medium 10. After interaction with the optical recording medium 10 the returning reading light beam 23 passes the quarter wave plate 8, which converts the polarization of the returning reading light beam 23 into a linear polarization. Therefore, most of the returning reading light beam 23 is diverted by the polarizing beam splitter 4 into a detection branch. In the detection branch the returning reading light beam 23 is directed by a second focusing lens 24 onto a detector 25 for generating a data signal HF. A small fraction 27 of the returning reading light beam 23 passes through the polarizing beam splitter 4, as the total reflection causes a slight rotation of the direction of polarization, and is directed by the non-polarizing beam splitter 19 and a third focusing lens 26 onto a detector 28 for generating a gap error signal GES. For generating the gap error signal use is made of the fact that the amount of reflected light due to total internal reflection in the solid immersion lens 9b is proportional to the size of the air gap at least in the size range used for near-field storage. Further details on optical storage systems making use of near-field optics and the gap error signal are disclosed in F. Zijp et al.: "*High-Density Near-Field Optical Recording With a Solid Immersion Lens, Conventional Actuator, and a Robust Air Gap Servo*", IEEE Trans. Mag., Vol. 41 (2005), pp. 1042-1046.

FIGS. 3 to 6 show the basic concept of an apparatus 1 according to the invention for reading from a near-field optical recording medium 10. The apparatus 1 is based on the optical design illustrated in FIG. 2. However, a plurality of modifications is made to enable homodyne detection. For better understanding the apparatus is first described during operation in a conventional detection mode, which is illustrated in FIG. 3. A light beam 3 emitted by a light source 2 is collimated with a first collimating lens 7 and passes through a first non-polarizing beam splitter 19, which has a transmission of about 50%. Though not shown in FIG. 3, the light reflected by the first non-polarizing beam splitter 19 can be used for monitoring the energy of the light beam 3, similar to the solution of FIG. 2. The light beam 3 is then focused by a first focusing lens 29 and passes through a mirror 31 with a center hole, whose function will be explained later with reference to FIG. 6. In the following the light beam 3 is collimated again by a second collimating lens 32 and passes through a first polarizing beam splitter 4 with nearly 100% transmission. Afterwards, the light beam 3 passes through a half-wave-plate 14 and a special element 33, which in the homodyne detection mode will be used to split the light beam 3 into two different components 3', 3" with perpendicular polarization. In the conventional mode the element 33 is not active for the light beam 3. Subsequently the light beam 3 passes through an aberration correction element 34, which also is not active for the light beam 3, and a quarter wave plate 8. The light beam 3 is then focused onto the optical recording medium 10 by a near-field lens 9 consisting of an objective lens 9a and a solid immersion lens 9b.

After reflection at the optical recording medium 10 the polarization of the signal beam 40 is rotated by 90° due to the quarter-wave-plate 8. The special element 33 is active for this polarization. Consequently, the signal beam 40 follows the slightly tilted light path shown in FIG. 3. Except for the small diffraction angle δ this path is the same as in conventional pickups for near-field storage. The signal beam 40 is diverted by the first polarizing beam splitter 4 towards a second non-polarizing beam splitter 35, which splits the signal beam 40 into two components 41, 42. The first component 41 is focused by a second focusing lens 36 onto a first detector 37 for detecting a track error signal TES. The second component 42 is diverted by a second polarizing beam splitter 39 towards a third focusing lens 24, which focuses the second component 42 onto a second detector 25 for detecting a high frequency data signal HF. Finally, a small fraction 27 of the signal beam 40 passes through the first polarizing beam splitter 4 and is diverted by the first non-polarizing beam splitter 19 towards a fourth focusing lens 26, which focuses this fraction 27 onto a third detector 28 for detecting a gap error signal GES.

The special element 33 is preferably realized as a polarizing beam splitter with a blazed grating structure, which keeps one polarization component unchanged (signal beam) and diffracts the beam component with perpendicular polarization at a small angle δ (local oscillator beam). The structure of this element 33 will now be explained in more detail with reference to FIG. 4. For further details see C.-H. Chen et al.: "*Off-Axis Astigmatic Reflector for Compact Optical Pickup*", Jap. J. Appl. Phys., Vol. 48 (2009), pp. 03A016. Arranged on a blazed grating 331 made of PMMA is a liquid crystal layer 332. The liquid crystal layer 332 is covered by a polyimide layer 333 and a glass cover layer 334. The liquid crystal is chosen such that the blazed grating 331 is not visible for one polarization direction, whereas it acts as a diffractive element for a perpendicular polarization. From now on the special element 33 shall be referred to as polarizing grating 33 for simplicity.

A detailed illustration of the front part of the solid immersion lens 9b used in the apparatus 1 according to the invention is depicted in FIG. 5. The solid immersion lens 9b focuses the light beam 3' through a cover layer 103 of the optical recording medium 10 onto a data layer 102, which is arranged on a substrate 101. The outer area of the front surface of the solid immersion lens starting at a radius $r_4$ up to a radius $r_2$ is provided with a flat recess 90 acting as a reflective surface to allow the reflection of an off-centered reference beam 3'. A part of this recess 90 is preferably covered with a reflective coating 91 to increase the amplitude of the reflected reference beam. Furthermore, the reflecting surface of the recess 90 is advantageously slightly tilted with regard to the optical axis of the solid immersion lens 9b to optimize the direction of the reflected light. For a solid immersion lens 9b with a numerical aperture NA=1.46 and a refractive index $n_{SIL}$=2.086 in combination with a cover layer 103 with a thickness d=3 µm and a refractive index $n_{CL}$=1.6 it can be calculated that the minimum radius $r_1$ for the near-field recording area is $r_1 \approx 6.7$ µm. Consequently, a radius $r_4$=10 µm is sufficient for focusing the light beam 3'. The reference beam 3" can be focused at an offset of $r_3 \approx 13$ µm. A possible value for the outer radius $r_4$ is $r_4$=20 µm.

For the reflected light three different components have to be considered. The first component is the signal beam 40, which has a perpendicular polarization compared to the incoming light beam 3' after the quarter wave plate 8. The second component is the light which is generated by total internal reflection at the front surface of the solid immersion lens 9b. This component is usually used for the gap error signal detection. For details, see e.g. K. Saito et al.: "*Readout Method for Read Only Memory Signal and Air Gap Control Signal in a Near-field Optical Disc System*", Jap. J. Appl. Phys., Vol. 41 (2002), pp. 1898-1902. The polarization of this component is perpendicular to the signal beam 40. The third component is the reference beam 3", which has polarization perpendicular to the polarization of the signal beam 40 due to the polarizing grating 33. All three components behave differently in the backward path, as will be discussed below with reference to FIG. 6.

FIG. 6 depicts the apparatus 1 according to the invention in a homodyne detection mode. The light path is the same from the light source 2 to the half wave plate 14. However, this half wave plate 14 is rotated by an angle α with respect to the primary polarization after the first polarizing beam splitter 4. Typically the angle α is between 22.5° and 45° in order to turn the polarization by an angle 2α between 45° and 90°. The light beam 3 is then split by the polarizing grating 33 into two components 3', 3". The first component is the non diffracted signal beam 3' (drawn with solid lines), the second component is the diffracted reference beam 3" (drawn with dash-dotted lines). By changing the angle α the intensity ratio between the two components 3', 3" can be adjusted. In addition, the light power is increased to maintain the energy of the non diffracted part of the light, i.e. the signal beam 3', constant. This is indicated by the solid arrows shown in the top view of the polarizing grating 33 in FIGS. 3 and 6, which have the same length. Apparently the intensity of the diffracted beam 3", which is shown by the dashed arrow in the top view of the polarizing grating 33, increases with $(\tan(2\alpha))^2$. The dotted arrow denotes the direction of polarization of the light beam 3. For the alignment of the polarizing grating 33 and the quarter wave plate 8 it is preferable to rotate the quarter wave plate 8 instead of rotating the polarizing grating 33, because the orientation of the polarizing grating has to be aligned with the orientation of the detectors.

Next, both light beams 3', 3" pass through the aberration compensation element 34, which is only effective for the reference beam 3". The purpose of this element 34 will be explained below. Before entering the near-field lens 9 both light beams 3', 3" are converted into circular polarized light beams by the quarter wave plate 8. The signal beam 3' passes through the near-field lens 9 and is focused onto the data 102 layer of the optical recording medium 10 with a diffraction limited focus. In contrast, the reference beam 3" is focused to an off-centric point of the solid immersion lens 9b as illustrated in FIG. 5. More details of the design parameters such as diffraction angle and beam offset will be given in the next paragraph. The off-centric focus position of the reference beam 3" causes optical aberrations, which are compensated by the aberration compensation element 34.

In the following the optical path of the reflected signal beam 40 shall be explained. After reflection the polarization of the signal beam 40 is rotated by 90° due to the quarter wave plate 8. Therefore, the aberration compensation element 34 and the polarizing grating 33 are active in the backward path, which leads to slight wavefront distortions as well as to a small diffraction of the signal beam 40 (drawn with solid lines in FIG. 6). However, as the polarization of the signal beam 40 is rotated back by the half wave plate 14, there is a mixed polarization at the position of the first polarizing beam splitter 4. Consequently, the signal beam 40 is partly reflected and partly transmitted by the first polarizing beam splitter 4, i.e. it is split into two partial beams 40', 40".

A small fraction of the light 40' reflected by the first polarizing beam splitter 4 is used for generating a push-pull track error signal TES by detecting the light on a third detector area 37-3 of the first detector 37. The main part of the signal beam 40' is reflected by the second non-polarizing beam splitter 35 and then by the second polarizing beam splitter 39. Due to the small diffraction angle α the reflected signal beam 40' is not aligned to the optical axis of the different components. Further, due to the different optical paths of the signal beam 40' reflected by the first polarizing beam splitter 4 and the signal beam 40" transmitted by the first polarizing beam splitter 4 the diffraction angle after combination by the second polarizing beam splitter 39 is opposite. After combination the light beams 40', 40" pass through a further half wave plate 43, are split by a third non-polarizing beam splitter 44, and are illuminated onto the second detector 25 and a fourth detector 45. The detectors 37, 25, 45 are all split into three areas, similar to pickups using three beam methods such as differential push-pull tracking. The further half wave plate 43, the third no polarizing beam splitter 44 and the two detectors 25, 45 are needed to obtain an interference between the signal beam 40', 40" and the reference beam 3" on each detector. This is because the light beams with the same focus point, e.g. the signal beam 40" and the reference beam 3" on the first detector area 25-1 of the second detector 25 have perpendicular polarization. This is comparable to the homodyne detection approach described in H. Mikami et al.: "*Amplification of Optical Disk Readout Signals by Homodyne Detection*", Jap. J. Appl. Phys., Vol. 48 (2009), pp. 03A014. The light component 40' reflected by the first polarizing beam splitter 4, the second non-polarizing beam splitter 35 and the second polarizing beam splitter 39 reaches the detector areas 25-3 and 45-3, whereas the main component 40" reflected by the mirror and collimated by a third collimating lens 38 reaches the detector areas 25-1 and 45-1. The signal amplitude S detected on each detector area depends on the angle α in the following way:

$$S(25\text{-}1) = S_{0\_25} \times (\sin(2\alpha))^2$$

$$S(45\text{-}1) = S_{0\_45} \times (\sin(2\alpha))^2$$

$$S(25\text{-}3) = S_{0\_25} \times (\cos(2\alpha))^2$$

$$S(45\text{-}3) = S_{0\_45} \times (\cos(2\alpha))^2,$$

where $S_{0\_25}$ and $S_{0\_45}$ denote the signals measured for α=0 on the detector areas 25-3 and 45-3, respectively. For α=0 the signal on the detector areas 25-1 and 45-1 vanishes and the situation is the same as in the conventional detection mode shown in FIG. 3.

As its polarization is perpendicular to the polarization of the signal beam 40, the light 27 which is reflected at the surface of the solid immersion lens 9b by total internal reflection is neither influenced by the aberration compensation element 34 nor by the polarizing grating 33. Therefore, the optical path is quite similar to a standard pickup for near-field storage. However, due to the mixed polarization state this light is partly reflected and partly transmitted by the first polarizing beam splitter 4. The 'classical' optical path for detection of the gap error signal GES encompasses the second collimating lens 32, the first focusing lens 29, the first non-polarizing beam splitter 19, the fourth focusing lens 26 and the third detector 28. With increasing angle α this component 27 and, correspondingly, the signal amplitude on the third detector 28 changes as follows:

$$S(28) = S_{0\_2} \times (\cos(2\alpha))^2.$$

The 'leaky' light 27' for gap error signal detection, which is reflected by the first polarizing beam splitter 4, reaches the detector areas 37-2, 25-2 and 45-2 and increases with $(\sin(2\alpha))^2$:

$$S(37\text{-}2) = S_{0\_37} \times (\sin(2\alpha))^2$$

$$S(25\text{-}2) = S_{0\_25} \times (\sin(2\alpha))^2$$

$$S(45\text{-}2) = S_{0\_45} \times (\sin(2\alpha))^2$$

Either one of the detector 28 and the detector areas 37-2, 25-2 and 45-2, or any combination of the sum of the signals of these detectors, can be used to generate the gap error signal GES for adjusting the gap between the near-field objective lens 9 and the surface of the optical recording medium 10.

The reflected reference beam 3" is neither influenced by the compensation element 34 nor by the polarizing grating 33. Similar to the signal light beam 40 and the light beam 27 used for generating the gap error signal the reference light beam 3" has a mixed polarization state when it reaches the first polarizing beam splitter 4. Therefore, one part of the reference beam 3" passes through the polarizing grating 33, the first polarizing beam splitter 4, and the second collimating lens 32 with a constant angle δ until the light beam 3" reaches the focus of the second collimating lens 32. Here, the reference beam 3" is separated from the light beam 27 for generating the gap error signal GES by the mirror 31. Consequently, the reference beam 3" has no influence in the illumination path or on the gap error signal GES. Instead, the reference beam 3" is reflected towards the second polarizing beam splitter 39. Finally, the reference beam 3" is split by the third non-polarizing beam splitter 44 and reaches the detector areas 25-3 and 45-3. With increasing angle α this component and, correspondingly, the reference signal amplitude on the detector areas 25-3 and 45-3 change as follows:

$$R(25\text{-}3)=R_{0\_25}\times(\tan(2\alpha)\times\cos(2\alpha))^2$$

$$R(45\text{-}3)=R_{0\_45}\times(\tan(2\alpha)\times\cos(2\alpha))^2,$$

where $R_{0\_25}$ and $R_{0\_45}$ denote the signals measured for α=0 on the detector areas 25-3 and 45-3, respectively. The second component of the reference beam 3", which is reflected by the first polarizing beam splitter 4, is again split by the second non-polarizing beam splitter 35. A smaller fraction of this light reaches the detector area 37-1, which can be used to monitor the laser power. The main component is reflected by the second non-polarizing beam splitter 35 and then by the second polarizing beam splitter 39 and reaches the detector areas 25-1 and 45-1. With increasing angle α this component and, correspondingly, the reference signal amplitude on the detector areas 25-1 and 45-1 changes as follows:

$$R(25\text{-}1)=R_{0\_25}\times(\tan(2\alpha)\times\sin(2\alpha))^2$$

$$R(45\text{-}1)=R_{0\_45}\times(\tan(2\alpha)\times\sin(2\alpha))^2,$$

As a consequence, the homodyne detection signal HDS of the two detector pairs 25-1/45-1 and 25-3/45-3, which is proportional to the square root of the amplitude of the signal beam 40', 40" multiplied with the amplitude of the reference beam 3" on the corresponding detector areas, can be expressed is as follows:

$$HDS(25\text{-}1/45\text{-}1)=HDS_1\times(\tan(2\alpha)\times\sin(2\alpha))^2$$

$$HDS(25\text{-}3/45\text{-}3)=HDS_2\times(\tan(2\alpha)\times\cos(2\alpha))^2.$$

Therefore, the total homodyne detection signal amplitude is proportional to $\tan(2\alpha)$.

FIG. 7 depicts a second embodiment of an apparatus 1 according to the invention, where an aberration of the signal beam 40 induced in the backwards path by the aberration correction element 34 is compensated by a second aberration correction element 46. The second aberration correction element 46 is designed such that the signal beam 40" and the reference beam 3" reaching the detector areas 25-1 and 45-1, respectively, have nearly the same wavefront. In this way the coherent addition of the electro-magnetic field components of both light beams 40", 3" is optimized.

In addition, the design of the apparatus 1 is simplified by blocking the reference beam 3" which propagates towards the mirror 31, and by eliminating the second focusing lens 36 and the first detector 37. For this purpose the second non-polarizing beam splitter 35 is replaced by a third polarizing beam splitter 47 or by a mirror prism (not shown) to achieve a maximum reflectivity. The different signals GES, TES, HDS are derived from the signals of the detector areas in the following way:

| | |
|---|---|
| Gap error signal (GES): | 28, 25-2 + 45-2 |
| Tracking error signal (TES): | 25-3 + 45-3 |
| Homodyne detection signal (HDS): | 45-1 − 25-1 |

As the homodyne detection signal HDS given by the detector areas 25-1 and 45-1 is proportional to $(\sin(2\alpha))^2$ and, preferably, α is larger than 25°, this contribution is much larger than the contribution of the detector areas 25-3 and 45-3.

Of course, more advanced detection schemes for homodyne detection can likewise be applied to the first embodiment in FIG. 6 and the second embodiment 2 in FIG. 7. Furthermore, by using an additional parallel plate and an adjustment of the tilt, the difference between the optical path length of the signal beam 40" and the optical path length of the reference beam 3" can be minimized. After this adjustment, the path length will not change during the operation of the apparatus as the movement of the actuator with the near-field lens 9 affects both, the signal beam 40" and the reference beam 3", in the same way.

For a large angle α and, correspondingly, a high intensity of the reference beam 3", the fourth objective lens 26 and the detector 28 for generating the gap error signal GES can be omitted, because the main component of the light 27' for gap error signal detection reaches the detector area 25-2 and 45-2. In this case the first non-polarizing beam splitter 19 only needs a reflectivity of a few percent (R<5%) to generate a laser power monitoring signal.

FIGS. 8 to 12 show the results of optical simulations that have been made to calculate the optical path outside and inside the solid immersion lens 9b for a focused illumination at different inclination angles δ. For the simulations it was assumed that for a regular illumination (δ=0) the rays of the focused beam pass the surface of the solid immersion lens 9b at an angle of 90°. The center of the principal plane of the objective lens 9a without the solid immersion lens 9b was used as a rotation center for the inclined illumination. The simulations are based on the following optical parameters:

| | |
|---|---|
| NA of the near-field lens 9 (without SIL 9b) | 0.7 |
| Refractive index of the SIL 9b | 2.086 |
| Diameter of the SIL 9b | 1 mm |

The simulations take two effects into account. The first effect is that the focus point moves up or down due to the tilt of the light beam. The second effect is that each ray is diffracted differently at the surface of the solid immersion lens 9b, which leads to a blur of the focus. This is equivalent to aberrations of the wavefront.

Concerning the simulation results, FIG. 8 depicts an inclined illumination of the solid immersion lens resulting from a diffraction angle δ of 1° without aberration compensation. FIG. 9 shows the corresponding results stemming from a diffraction angle δ of 5°. An enlarged view of the blurred focus for the diffraction angle δ of 1° is depicted in FIG. 10. The diagram in FIG. 11 shows the increasing defocus and beam offset with increasing inclination angle δ. The data points in the diagram were calculated by determining the intersection points between neighboring rays of FIG. 10. Finally, FIG. 12 depicts the increase of the beam offset with the inclination angle δ. The beam offset increases nearly linearly.

As can be seen in FIGS. 8, 9, 11 and 12 the beam offset increases with increasing inclination angle δ. At the same time the blur of the focus in z-direction also increases so that a compromise with sufficient offset and small blur needs to be found. In the previous paragraph it was already shown that the minimum offset should be larger than 10 µm. Therefore, a satisfactory compromise is reached with an inclination angle δ of about 1°, which corresponds to an offset of about 13 μm. The respective wavefront aberration, which is equivalent to the blurred focus, is compensated by the aberration compensation element 34.

The invention claimed is:

1. An apparatus for reading from a near-field optical recording medium, the apparatus comprising:
    an optical system for generating a signal beam and a reference beam;
    a near-field lens for illuminating the signal beam onto the near-field optical recording medium, for collimating a reflected signal beam, and for reflecting the reference beam; and
    at least a first detector and a second detector for obtaining a homodyne detection signal from the reflected signal beam and the reflected reference beam.

2. The apparatus according to claim 1, wherein the optical system comprises a light source for generating a reading light beam and an optical element for generating the signal beam and the reference beam from the reading light beam.

3. The apparatus according to claim 2, wherein the optical element is a polarizing grating including at least a grating structure and a liquid crystal layer.

4. The apparatus according to claim 1, wherein the reference beam is inclined with respect to the signal beam.

5. The apparatus according to claim 2, wherein the optical element is adapted to split the reflected signal beam into at least two partial signal beams.

6. The apparatus according to claim 1, further comprising a beam splitter for splitting the reflected reference beam into at least two partial reference beams.

7. A method for reading from a near-field optical recording medium, the method comprising the steps of:
    generating a signal beam and a reference beam;
    illuminating the signal beam onto the near-field optical recording medium with a near-field lens;
    collimating a reflected signal beam with the near-field lens;
    reflecting the reference beam with the near-field lens; and
    obtaining a homodyne detection signal from the reflected signal beam and the reflected reference beam with at least a first detector and a second detector.

8. The method according to claim 7, further comprising the step of generating the signal beam and the reference beam from a reading light beam generated by a light source.

9. The method according to claim 7 further comprising the step of inclining the reference beam with respect to the signal beam.

10. The method according to claim 7, further comprising the step of splitting the reflected signal beam into at least two partial signal beams.

11. The method according to claim 7, further comprising the step of splitting the reflected reference beam into at least two partial reference beams.

* * * * *